June 26, 1951 A. G. BODINE, JR Re. 23,381

METHOD OF AND APPARATUS FOR TREATING WELLS

Original Filed May 14, 1941

PRESSURE VARIATIONS

VELOCITY VARIATIONS

INVENTOR
ALBERT G. BODINE, JR.
BY
HARRIS, KIECH, FOSTER & HARRIS
Ward D. Foster
FOR THE FIRM
ATTORNEYS Reissued June 26, 1951

Re. 23,381

UNITED STATES PATENT OFFICE 23,381

METHOD OF AND APPARATUS FOR TREATING WELLS

Albert G. Bodine, Jr., Van Nuys, Calif.

Original No. 2,437,456, dated March 9, 1948, Serial No. 393,352, May 14, 1941. Application for reissue May 13, 1948, Serial No. 26,904

17 Claims. (Cl. 166—20)

Matter enclosed in heavy brackets [ ] appears in the original patent but forms no part of this reissue specification; matter printed in italics indicates the additions made by reissue.

My invention relates to a method of and apparatus for treating wells, and more particularly to a method of and apparatus for treating wells utilizing energy so transmitted by sound waves through an elastic medium that there is a standing or stationary wave in the medium. Since it finds particular utility in treating oil wells of conventional construction, the application of my invention to such use will be described for illustrative purposes, it being understood that my invention is not restricted to such use.

Difficulty is frequently experienced in the pumping of such wells, due to the accumulation of particles of sand, gravel, wax, and material partially soluble in the oil, within the openings between the oil tubing and casing and within the openings in the casing, impeding or preventing the passage of oil therethrough. It is an object of my invention to provide a method of and apparatus for quickly and effectively freeing the openings in the oil tubing and well casing of the solid particles which wholly or partially close the same.

Difficulty is often encountered with similar particles deposited in the formation at or within a few hundred feet of the lower end of the well, impeding or damming off the oil from flowing into the lower end of the well. It is an object of this invention also to provide a method of and apparatus for freeing the formation of such flow-impeding particles. My invention contemplates the freeing of the formation and the openings in the casing and tubing of the solid particles insoluble in oil, by their rapid agitation or pulverization by abrasion and the removal of the flow-impeding materials insoluble or partially soluble in oil, by their emulsification or homogenization with the oil or their pulverization by abrasion to a particle size facilitating their removal in suspension in the oil.

It has been the prior practice to attempt to remove such flow-impeding materials by forcing liquid downwardly in the well and through such openings and into the formation. Such practice has been unsatisfactory in that such materials as are removed from the openings in the casing and the tubing are forced outwardly into the formation and accumulated therein to again exert a flow-impeding action. Furthermore, such practice has been ineffective because the velocity of the wash liquid is of a very low order, its flow is in one direction only, and the force thus exerted upon the clogging particles is not substantial.

My invention contemplates the accomplishment of the objects hereinbefore stated, utilizing sound waves as means of transmitting energy to the clogging particles. By sound waves is meant not only those frequencies of vibratory motion within the auditory range, but also other and very much higher frequencies. Likewise my invention contemplates the transmission of energy by sound waves not only through air or gas, but also through solids and liquids. Furthermore, by my invention the sound waves transmitted may represent alternate increases and decreases in pressure relative to a mean pressure which may be greater than normal or atmospheric pressure (as when a vertical column of water is the transmitting medium) or which may be less than the pressure on the medium at rest (as when a stretched wire is the transmitting medium).

In the transmission of sound waves through an elastic medium, the movement of the particles of the medium is purely local, each particle making small to-and-fro excursions in a manner similar to the vibrating body generating the sound waves. The particles move in the same line as the directions of travel of the wave and only a very short distance in the medium.

My invention contemplates utilizing such movement of the particles in response to sound waves for the accomplishment of a flow of liquid and a movement of solid particles in both directions through the openings adjacent the bottom of the oil tubing and well casing and the formation adjacent thereto.

Furthermore, my invention contemplates an amplitude of in-and-out movement of the particles of the liquid and the solid particles through the openings adjacent the bottom of the oil tubing and well casing and in the formation, which is greater than the amplitude of movement of such particles, in such openings and in the formation, when a single pressure impulse or sound wave, or a series of unrelated pressure impulses or sound waves is transmitted to the particles. This I accomplish by establishing within the medium transmitting the sound waves a resonant condition in which a large part of the energy supplied by the generating vibrator is stored in the medium by the reflection of the sound waves in such manner as to reinforce those originating with the generating vibrator to establish within the medium a standing wave. This reinforcement by reflection continues and increases the amplitude of the standing wave until the energy consumed by friction of the liquid passing in and out of the openings in the tubing or casing or formation and by the generation of heat and by overcoming inertia of the reciprocating parts is equal to the energy input to the generating vibrator.

Before such a condition of equality is reached, however, the amplitude of the standing wave is so increased that its wave fronts are very steep, and the velocity and acceleration of the particles of the wave-transmitting medium at the maximum velocity variation zones are very great, and the velocity and acceleration of such particles may be in excess of the velocity and acceleration of the particles adjacent the surface of the generating vibrator and are usually much greater than the velocity and acceleration of the particles adjacent the receiving vibrator.

Embodiments of my invention capable of accomplishing the foregoing objects and providing the foregoing advantages and others are illustrated in the accompanying drawings in which Fig. 1 is a fragmentary vertical sectional view of one embodiment of my invention;

Figure 1:
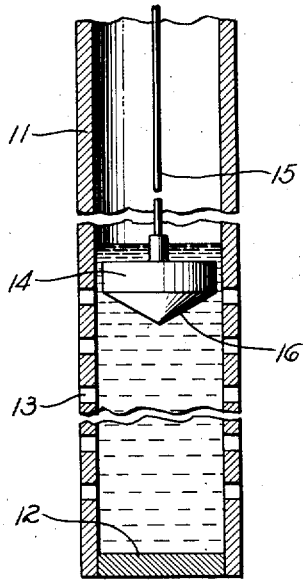

In Fig. 1 is illustrated a casing 11 installed in an oil well and substantially closed at its lower end, indicated by the numeral 12, as by an end plate or a cement plug. The casing 11 has adjacent its lower end a plurality of openings 13 which may be slots or perforations.

A receiving vibrator or vibrating element 14 is suspended within the casing 11 on or below the surface of the liquid therein. The vibrator 14 is suspended from a metal wire or cable 15, which may be piano wire or the like, and is subjected to sound waves by variations in tension thereon by a vibration generating mechanism or generator at the surface of the ground. Preferably the period of vibration of the cable 15 and its length are so related that there is a standing sound wave in the cable 15 between the generator and the receiving vibrator 14. In other words, the wave length of the impulses in the cable 15 are so related to the length of the cable 15 that a resonant condition is established, the impulses or sound waves reflected along the cable 15 by the vibrator 14 reaching the generator at the exact time that like impulses or sound waves are imparted by the generator to the cable.

Preferably also the vibrator 14 is spaced such a distance from the lower closed end 12 of the casing 11 that a resonant condition is established within the column of liquid therebetween. Of these two resonant conditions that one existing in the column of liquid is of the lesser importance.

I prefer, particularly when transmitting the sound waves through different media, to utilize a sound wave generator having simple harmonic motion, since such motion may be transmitted from one medium to another without change of wave form.

A determination of the weight of the vibrator 14 is governed by the frictional resistance to its reciprocation within the casing 11 and principally by the resistance to its movement offered by the liquid in contact therewith. The vibrator must be made of sufficient weight that its efficiency as an energy-transmitting element is not overcome by the inertia and other resistances to motion of the vibrating element which, if the vibrator is very light, may serve to damp out entirely its movement and render negligible the energy transmitted thereby. This determination is governed also by the fact that, as the weight is increased, the tension in the cable 15 is increased, which has the desirable effect of permitting the transmission of waves of greater amplitude and thus the transmission of an increased amount of energy to the vibrator. A consideration limiting the weight of the vibrator 14 is the fact that, as the weight is decreased, a greater vertical motion of the vibrator 14 is made possible, which has the desirable effect of increasing the amplitude of the standing wave in the liquid and hence increasing the energy transmitted from the vibrator through the liquid.

While the lower end of the vibrator 14 may, if desired, be made with a horizontal surface, it is preferred that it be convexed downwardly, and it may be formed in the shape of a cone with its apex downwardly directed, as indicated by the numeral 16. Such a shape of the lower surface of the vibrator 14 serves to direct the impulses or sound waves angularly relative to the axis of the casing 11 and thus better direct the impulses or sound waves in the liquid through the openings 13 in the casing.

As is well known, the directional property of a wave train increases as the frequency increases or the wave length decreases. It will be seen, therefore, that because of this tendency of impulses in the liquid generated by the vibrator 14 to travel in the direction of travel of the vibrator 14 the amount of clearance between the vibrator 14 and the casing 11 may be increased as the frequency of vibration of the element 14 is increased or the wave length of the wave train in the liquid is decreased. For frequencies below approximately 100 vibrations per second, the vibrator 14 should fit rather closely within the casing 11.

The frequency of vibration of the cable 15 and vibrator 14 is governed by the purpose to be accomplished by the wave train in the liquid below the vibrator 14. It is possible to vibrate the element 14 with a frequency approximating the natural period of vibration in their environment in the well of the particles of sand or other solids clogging the openings 13 in the casing 11. Such frequency may be of the order of 100,000 vibrations per second. While it is difficult to determine the natural period of vibration of such particles in the absence of complete knowledge of the conditions at the bottom of the well, it will be found that, if such natural period of vibration be anywhere nearly approximated by the period of the wave train in the liquid, the particles will be vibrated and dislodged from positions clogging the perforations 13. Very beneficial results may be achieved by varying the frequency of the vibration of the element 14 from 50,000 to 100,000 impulses per second, thus approximating the natural period of vibration of particles of many different sizes under many different conditions of environment.

If it is desired to homogenize or dissolve flow-impeding particles of a material insoluble or partly soluble in the liquid contained in the well or to pulverize particles by abrasion to a particle size facilitating their removal suspended in the liquid, which particles are in or adjacent the bottom of the well, a lesser frequency is impressed upon the vibrator 14. This frequency, of course, varies with the properties of such materials and their environment, but it is found that frequencies of a very wide range are extremely beneficial in effecting this result; for example, frequencies of the order of 5,000 to 75,000 per second will be found to have beneficial properties in effecting the dislodgment of such particles and their removal with the liquid from the well.

In impressing a frequency to pulverize the wax, there is avoided a frequency which would cause an undesirable emulsification of the oil and water. If such an emulsion is formed, however, it is not of the utmost importance, since the quantity of emulsion produced will be small and will be removed by the first flowing or pumping of the well. Under some circumstances it may be desirable to employ a frequency to emulsify water or sludge, trapping the emulsion in the formation or at the bottom of the well and preventing the flow of the fluids into the well.

If it is desired to establish the maximum acceleration of liquid in and out of the openings 13 in the casing 11, a frequency is impressed upon the vibrator 14 of lesser value. This frequency may be of the order of 10,000 to 20,000 impulses per second.

*If it* [It] is desired to subject the formation around the lower end of the casing 11 to impulses of the maximum magnitude in order to increase the flow of fluids through the formation to the casing 11, a lower frequency is impressed upon the vibrator 14. Such a frequency is of the order of 1,000 pulsations per second or less and may well be as low as 50 pulsations per second, the waves travelling in the formation as far as a few hundred feet from the well.

It will be seen that, by varying the speed of the impulse generating device, all or any of the desired ranges of frequencies herein set forth may be employed with the same apparatus to accomplish all of those respective results hereinabove identified.

The amplitude of the movement of the vibrating element 14 will, of course, vary with its frequency. If the frequency is low, for example, in the neighborhood of 50 vibrations per second, its amplitude of movement may be comparatively large, for example, of the order of a few inches. If the frequency of the element 14 is large, for example, in the neighborhood of 100,000 vibrations per second, its amplitude of movement is decreased to, for example, a distance of the order of a few 1000ths of an inch.

Figure 6:
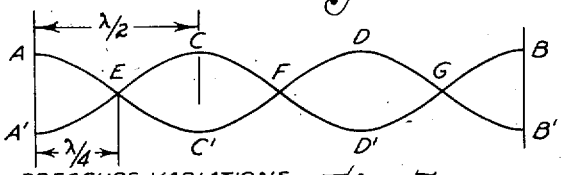
Figs. 6 and 7 are diagrammatic illustrations of a standing sound wave in an elastic medium.

When the frequency of vibration of the vibrator 14 is adjusted for the maximum velocity of liquid through the openings 13, it may be found that the velocity of the liquid in such openings is greater than or equal to or less than that of the vibrator 14, factors affecting these relative velocities being the decrease or damping out of the sound waves in the liquid and the degree of resonance. As the frequency of the impulses in the liquid column is increased and as the degree of resonance established in this liquid column is improved, the steepness of the wave fronts is increased. Such an increase in the steepness of the standing waves within the liquid column increases both the velocity and acceleration of the liquid at the velocity variation nodes in the stationary wave. While the movement of the liquid through the openings 13 may be for only a very short distance, such as a fraction of an inch, its velocity will be very great, for example, of the order of 100 feet per second. From the high frequency of the sound wave transmitted, it will be seen that the acceleration in both directions of the liquid through the openings 13 is extremely great. The performance of the method of my invention thus has an effect dislodging particles from the openings 13 and formation adjacent thereto wholly unobtainable by forcing a washing fluid through the casing 11 in accordance with prior practice. For example, I have illustrated diagrammatically in Fig. 6 a standing wave in either the cable 15 or the liquid column between the vibrator 14 and the closed end 12 of the casing 11, assuming for illustrative purposes that the effective length of the cable or column is equal to one and a half wave lengths. In Fig. 6 the abscissa scale represents the distance along the cable or liquid column and the distance between a line drawn through EFG and the base of the abscissa scale represents the mean pressure within the cable or column, the ordinates representing variations in pressure above and below such mean-pressure value.

It will be seen that a zone of maximum pressure variation is present at points A, A′ and B, B′, representing the surface of the generating vibrator and the closed end of the column or lower end of the cable respectively, and that other maximum pressure variation zones are located along the cable or liquid column at distances of one-half wave length from points A and B and each other respectively, as indicated by the points C, C′ and D, D′.

The curve A, E, C′, F, D, G, B′ may be considered as a single sound wave travelling in the elastic medium. It will be seen that, when a pressure impulse generated at pointA reaches point D, a distance of one wave length, the second impulse is generated at point A. When the second impulse has reached point D, the first impulse has travelled to point B′ and been reflected as a like impulse to point D. Likewise, when the third impulse reaches point D, the second impulse has been reflected from point B to point D, and the first impulse has reached point A, from which it is reflected to reinforce the fourth impulse generated at that instant at point A. The impulses reflected from points B and A, therefore, act to reinforce the impulses generated at point A, so that the amplitude of the standing wave, and hence the steepness of the wave, is constantly increased until that condition of equality previously described has been reached.

Figure 7:
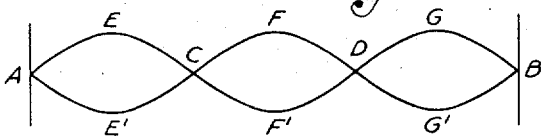

Since the ordinates of the graph of Fig. 6 represent variations in pressure along the cable or liquid column, it will be seen that the zones E, F and G, located half way between the maximum pressure variation zones, represents zones of minimum pressure variations or zones of maximum velocity variations. Thus, if there be plotted velocity variation of the particles as ordinates against the same abscissa employed in Fig. 6, a graph like Fig. 7 is provided, the maximum velocity variation zones being located at points E, E′, F, F′, and G, G′ and the minimum velocity variation zones or maximum pressure zones being located at points A, C, D, and B. At points A, C, D, and B the velocities in opposite directions urged upon the particles by travelling waves of opposite and equal amplitudes are equal, with the result that particles at these points do not move, but are by such opposite forces subjected to the maximum pressure variation.

It will be seen that, if the standing wave within the liquid column is adjusted so that the zones of maximum velocity variations are located adjacent the openings in the casing or tubing to be cleaned the greatest velocity of liquid therethrough will be obtained. This is a condition easily secured, particularly with high frequency sound waves, since the zones of maximum velocity variations of the stationary wave so formed are very close together. With low frequency sound waves the relative position of the vibrator 14 with respect to the closed end 12 of the casing 11 may be readily adjusted to obtain the desired condition. In a similar manner the standing wave within the liquid column may be adjusted so that the zones of maximum pressure variation are adjacent the openings in the casing or tubing when desired, as for example, when such openings are substantially filled with flow-impeding particles.

To establish this resonant condition within the column of liquid between the vibrator 14 and the closed end 12 of the casing 11, the column is made of a length equal to any multiple of a half wave length. Likewise, a resonant condition is established in the cable 15 by making its length between the generator and the vibrator 14 any multiple of a half wave length. The wave length in the metal cable 15 will, of course, be greater than the wave length in the liquid in the casing 11, since the velocity of the sound waves in the cable 15 is much greater than their velocity in the liquid column.

If there be employed as a prime mover for the vibration generating device at the surface of the ground, a gas engine, or an electric motor of non-synchronous type, it will be found that the engine or motor will automatically tend to assume that speed establishing a resonant condition of the wave train in the cable 15, because at such condition any increase in speed considerably increases the energy load on the prime mover, thus retarding its speed, and any decrease in speed is resisted by a rapid decrease in the energy load on the prime mover which allows immediate acceleration of the engine. A resonant condition for all but very high frequency sound waves may be readily established in the liquid column between the vibrator 14 and the closed end of the casing 11 by varying the length of the liquid column and the effective length of the cable 15 until audible beats are absent. The resonant condition in the liquid column diminishes in importance as the frequency of vibration increases, the waves being damped out within a short distance from the vibrator 14 at the very high frequencies hereinbefore mentioned.

Figure 2:
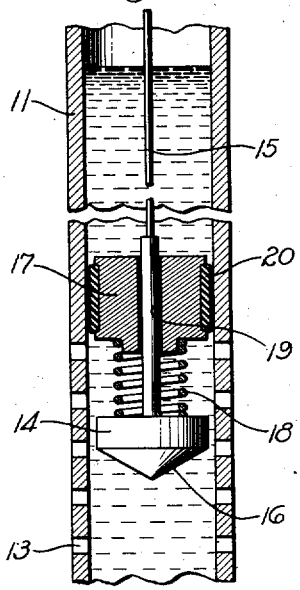
Fig. 2 is a fragmentary vertical sectional view of a second embodiment of my invention.

An embodiment of my invention taking advantage of an increase in tension in the cable 15 and at the same time utilizing the advantage of the light weight of the vibrator 14, is illustrated in Fig. 2, in which a weight 17 is positioned within the casing 11 with the cable 15 running freely therethrough, the weight being of a diameter slightly less than the inner diameter of the casing. A coil compression spring 18 is positioned between the weight 17 and the vibrator 14.

In this embodiment of my invention the weight 17 operates to place the desired tension upon the cable 15, facilitating a high rate of transmission of energy therealong. A condensation or compression impulse in the spring 18 being reflected from the weight 17 as a like impulse, the spring 18 automatically acts as a continuation of the cable 15 of a length equal to one-fourth a wave length of the impulses in the cable 15, so that the vibrator 14 occupies a position in the stationary wave in the cable 15 corresponding to a maximum velocity variation zone, and the weight 17 occupies a position in the stationary wave in the cable 15 corresponding to a maximum pressure variation zone or minimum velocity or no velocity zone.

In this embodiment the spring 18 acts purely as a capacitance. The distance between the weight 17 and the vibrator 14 in its intermediate position represents a resonant condition in the liquid; that is, the length of the spring 18 is a multiple of one-half a wave length of the sound waves in the liquid.

If desired, there may be substituted for the portion of the cable 15 travelling through the weight 17 and extending therebeneath to the vibrator 14 a rod of substantial thickness which is guided in the central opening 19 in the weight 17, thus preventing contact of the vibrator 14 with the casing 11. There may with advantage be placed upon the periphery of the weight 17 a cushioning material 20, such as neoprene, rubber, or the like, for frictionally engaging and cushioning the contact between the casing 11 and the weight 17.

The weight 17 may be located beneath the vibrator 14 and connected thereto by the spring 18 under tension. The spring 18 acts in the same manner, and a resonant condition with a stationary wave in the cable 15 and liquid column is established in the same manner, as described for the arrangement of the spring 18 and weight 17 above the vibrator 14.

While I have described those embodiments of my invention referred to as applied to a well casing, they may with equal advantage be applied to tubing within a well having, instead of the slots or perforations, openings in wire mesh, or a liner, or interstices between particles in a gravel pack or strainer, the sound waves operating to free the openings in both the tubing and the casing around it.

Likewise, my invention may be applied using the pump tubing and strainer instead of the cable and vibrator. Thus, if the string of pump rods customarily employed is withdrawn from the pump tubing and the standing valve is removed from the cage, the string of tubing may be reciprocated, the strainer or cage at its lower end acting in all respects like the vibrating element 14, previously described. The effect of such reciprocation is imparted upon both the fluid inside the strainer and the fluid outside of the strainer within the casing, and also to some extent upon the fluid outside of the casing. Thus, liquid is forced at high velocity and acceleration radially through both the openings in the strainer screen and the slots in the casing, effectively cleaning both of them.

If desired, simultaneously with the reciprocation of the pump tubing there may be fed through the tubing and through the strainer a solvent for the wax or the like which may be deposited upon the screen or within the casing slots. Suitable solvents for this purpose include carbon tetrachloride, organic phosphate, nitropentane.

The radial movement of the liquid adjacent the perforations 13 in the casing 11 may be secured by substituting for the vibrator 14, in the embodiments described, a hollow plunger immersed in the liquid and having a plurality of jet openings in its sides which, during reciprocation, direct jets of liquid substantially radially.

Such advantage of directed flow of liquid combined with the advantage of a light weight vibrating element may be provided by forming in the vibrator 14 vertical passages opening on the top of the vibrator and communicating with radial passages opening on the side of the vibrator so that, during its reciprocation while immersed in the liquid, the liquid travels downwardly through the vertical passages and outwardly through the radial passages and is thus directed in jet form through the perforations in the casing 11. Any of the vibrating elements described may be moved vertically in the well to the desired proximity with perforations at different levels.

Figure 3:
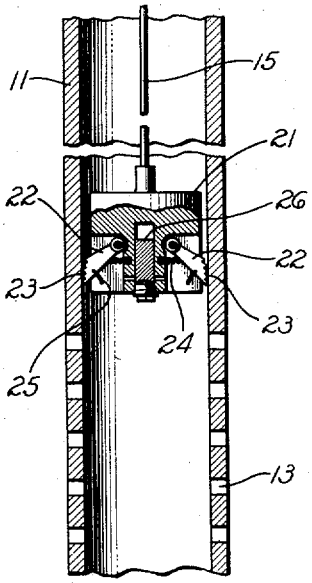
Fig. 3 is a fragmentary vertical sectional view of a third embodiment of my invention.

In Fig. 3 is illustrated an embodiment of my invention in which the impulses are directly transmitted from the cable 15 to the casing 11. In this embodiment there is secured to the lower end of the cable 15 a weight 21 greater than the tension impulses transmitted through the cable 15. The weight 21 is provided with depending arms 22 pivoted thereto and adapted, when extended, for gripping the interior of the casing 11 with teeth 23 upon their extremities. The arms 22 may be retained in their retracted position during their introduction into the casing and released when the desired position is reached by any suitable means. For example, they may be secured against the resilient tendency of springs 24 urging them outwardly, by a wire 25 adapted to be broken by a weight 26 slidable in the main weight 21 upon rapid upward movement of the weight 21. The arms 22 will drag upon and move inwardly over obstructions on the interior of the casing during their upward travel.

In this embodiment of my invention the impulse are transmitted by variations in the proportion (but not the relief of all) of the weight pressing against the casing 11, which variations are in response to a standing sound wave or tension wave in the cable 15. In this manner the casing or tubing 11 is itself rapidly vibrated by its elongation and contraction, freeing the particles clogging the openings therein. Such vibrations of the casing or tubing have the effect previously described of transmitting vibrations throughout adjacent strata, agitating flow-impeding particles therein, freeing them of waxes and the like, and increasing the flow of liquid therethrough to the tubing or casing.

It is possible by the use of any of the embodiments of my invention to transmit from a well surrounded by other wells impulses through the formation, increasing in the manner hereinbefore described the flow of fluids through the formations to all of such wells.

The invention is not limited in application to pumping wells, but may be employed also on flowing wells. For example, impulses may be impressed upon the annular body of liquid between the casing and a tubing to establish a standing sound wave in such column of liquid. Likewise, in a flowing well the column of liquid within the tubing may be employed as the means of transmitting to the devices and formations at the bottom of the well high frequency impulses having the purposes and results previously described. Such vibrations may be impressed upon an ascending stream of liquid in the pump tubing or in the annular space between the pump tubing and the casing as the liquid flows from the well.

My invention is capable of application to and use in connection with the pumping of a washing or solvent liquid down the well and through the openings in the casing, tubing, and formation by impressing upon this stream of descending liquid longitudinal vibrations of the character and with the effect previously described.

Figure 4:
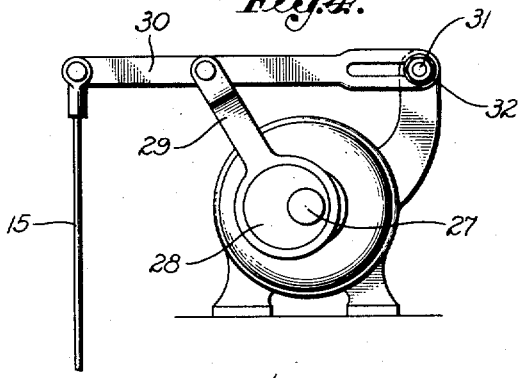
Fig. 4 is a side elevational view of a sound wave generating device adapted for use in accordance with my invention.

In Fig. 4 I have illustrated a generating device suitable for impressing impulses upon the cable 15. The device includes a shaft 27, which may be the drive shaft or a shaft geared in the desired speed relationship to the drive shaft, of a gasoline engine or electric motor, such as previously described, and rotating within an eccentric 28 connected by a crank arm 29 to an oscillating arm 30. The oscillating arm 30 is pivoted upon a horizontal pivot 31 and connected at its free end to the cable 15. The pivot 31 may be clamped by a nut 32 threaded thereto at various positions along the oscillating arm 30 to vary the amplitude of movement of the free end of the arm 30.

Figure 5:
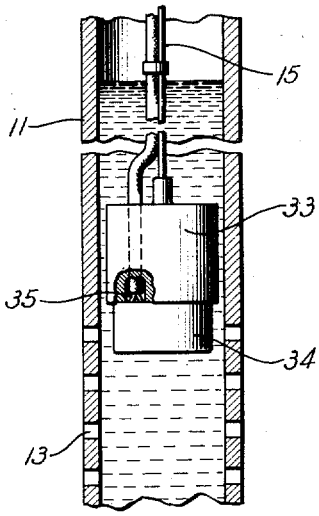
Fig. 5 is a vertical sectional view of another form of sound wave generating apparatus.

In Fig. 5 I have illustrated a weight 33 suspended upon a cable 15 from the surface of the ground. Connected to the lower surface of the weight 33 is an electric vibrating surface 34 for generation of sound waves in the liquid, such as a piezoelectric crystal or magneto striction bar, both of which are suitable for the ultra-high frequency ranges. The vibrating device 34 is connected by electrical conductors 35 to a source of oscillating current on the surface of the ground. Such a vibrating device may be employed at the surface of the ground to vibrate the cable with ultra-high frequency.

While those embodiments of the method and apparatus of my invention are fully capable of performing the objects and providing the advantages primarily stated, and the applications of my invention as described hereinbefore are illustrative of its operation and utility, various modifications of such methods and apparatus, and such applications may be made without departing from the scope of my invention as defined by the claims which follow.

I claim as my invention:

1. The method of dislodging material clogging an opening through which it is desired to conduct a fluid, which method includes the step of: transmitting sound waves *under standing wave conditions* [under conditions of resonance] through a body of liquid contacting such material; and adjusting the sound waves within said body to bring a zone of maximum pressure variation at the opening to be cleaned thereby to thus oscillate the liquid adjacent such a material with a frequency determined by said sound waves and with sufficient intensity to displace such material from clogging position.

2. The method of removing particles of a material from clogging relationship with a fluid passage, which method includes the steps of: subjecting such particles to the hydraulic pressure of a column of liquid; transmitting sound waves *under standing wave conditions* [under conditions of resonance] through such liquid column to produce a standing wave therein; adjusting the standing wave thus provided within said column to bring a zone of maximum pressure variation at the passage to be cleaned; and subjecting the clogging particles to the oscillatory action of the liquid produced by said sound waves until the adhesion of said particles with the passage is broken while maintaining such hydraulic pressure on such particles substantially constant.

3. The method of removing bodies of material having different natural resonant frequencies from clogging position in a fluid passage, which method includes the steps of: contacting said material with a body of liquid; transmitting sound waves *under standing wave conditions* [under conditions of resonance] through said liquid to such bodies of different material; and successively and selectively effecting vibration of said bodies of different natural resonant frequencies by varying the frequency of the transmitted sound waves to correspond to the particular frequencies of said bodies to effect removal of said bodies.

4. The method of removing flow-impeding bodies from a liquid passage in a well, which bodies are contacted by an elastic medium, which includes the steps of: transmitting sound waves through such elastic medium to such bodies; and relating the length of said sound waves and the distance they are transmitted through such medium so that said distance is a multiple of half of the wave length of the sound waves to establish in such medium a stationary wave having a maximum velocity or pressure variation zone located at a level substantially common to that of said passage.

5. The method of removing the impedance to flow of a liquid by particles in a passage in a well, which particles are contacted by a liquid incapable of carrying from the well such particles in their state when impeding flow, which includes the steps of: transmitting sound waves under *standing wave conditions* [conditions of resonance] to the particles through the liquid contacting them; varying the frequency of the sound waves to that necessary to convert such particles to a state facilitating their carriage from the well by the liquid; and removing from the well the liquid carrying such converted particles.

6. The method of dislodging material clogging openings in a well casing or tubing or the formation therearound, which material is immersed in a liquid in said well, which method includes the steps of: transmitting sound waves under *standing wave conditions* [conditions of resonance] to the liquid in the well through an elastic metallic medium under tension; and further transmitting such sound waves under *standing wave conditions* [conditions of resonance] through the liquid to such material to effect dislodgement thereof.

7. The method of dislodging particles from clogging relationship in openings in a well near the bottom thereof, which particles are immersed in a liquid in the well, which method includes the steps of: generating sound waves at a locus remote from the particles, which sound waves have a frequency of 50 to 100,000 cycles per second; and transmitting said sound waves under [conditions of resonance] *standing wave conditions* through the liquid to such particles to dislodge them from clogging relationship with respect to said openings.

8. In apparatus for dislodging particles adhering to a wall adjacent the bottom of a well, the combination of: sound wave-generating means; a member adapted to be immersed in the liquid in the well for vibration therein; and a wire connecting said means to said member for transmitting sound waves to said member under *standing wave conditions* [conditions of resonance], said member normally serving to transmit said sound waves to the liquid in the well under *standing wave conditions* [conditions of resonance] and having a convex lower surface to direct sound waves in the liquid downwardly and outwardly of the well.

9. Apparatus as defined in claim 8, in which a weight is disposed on one side of said member and a spring is interposed between said weight and said member.

*10. In an apparatus for increasing flow of petroleum fluids from a petroleum fluid bearing formation to a well sunk therein, the combination of: a continuous sound wave generator adapted to generate sound waves having a simple harmonic component, an elastic metallic sound wave transmission medium coupled to said generator and extending to the region of said formation, means for coupling said metallic medium in solid-to-solid relation to said formation ,said medium being adapted to transmit continuous sound waves from said generator to said coupling means and thence into said formation, and means for driving said generator at a speed to establish standing wave resonance in said metallic wave transmission medium, whereby to secure a maximum of continuous sound wave energy transmission from said generator into said formation.*

*11. A method for reducing the clogging of oil flow passages in a production well or in the formation therearound in a production oil field which method includes, physically connecting an elastic sound wave transmitter for liquid and solid media to a wave energy receiving medium in a well in said production field and thereby accomplishing an acoustic coupling, connecting a source of energy to said elastic sound wave transmitter, and supplying energy thereto so as to expend wave energy into said field to reduce the clogging of the oil flow passages and thereby increase the average production rate for said production well.*

*12. The method of claim 11 including positioning said transmitter in said production well thereby using said production well for the double purpose of consuming wave energy in said field and increasing oil production from said production well.*

*13. The method of claim 11 including the steps of attaching a metallic member to said wave transmitter, then positioning said metallic member with said wave transmitter in said energy receiving well and supplying wave energy along said metallic member to said wave transmitter.*

*14. The method of claim 11 including the steps of combining a sound wave generator means with said transmitter and positioning said combination in said energy receiving well and supplying vibratory energy to said transmitter via said generator means.*

*15. The method of claim 11 wherein said energy receiving well contains a body of liquid, including the step of immersing said transmitter in said liquid body.*

*16. The method of claim 11 including the step of mechanically connecting said transmitter to the walls of said energy receiving well.*

*17. For use in reducing the clogging of oil flow passages in a production well or in the formation therearound in a production oil field, an elastic sound wave generator with an output characteristic adapted to generate elastic sound waves for liquid and solid media having the resistance of petroleum containing media to sound wave vibration at the frequency of said generator, an elastic sound wave transmitting means operatively combined with said generator and adapted to couple said generator to a liquid or solid wave energy receiving media in a well located in said production field, and a power connection means for connecting said generator to a power source in said production field, whereby a sufficient average rate of power delivery may be conducted from*

*said power source to said generator and therein converted to elastic sound wave energy which is thereafter transmitted into said producing field so as to reduce the clogging of the oil flow passages and thereby increase the average production rate for said production well.*

ALBERT G. BODINE, JR.

REFERENCES CITED

The following references are of record in the file of this patent or the original patent:

UNITED STATES PATENTS

| Number | Name | Date |
|---|---|---|
| 420,692 | Miller | Feb. 4, 1890 |
| 1,654,819 | Kinley | Jan. 3, 1928 |
| 1,675,121 | McCollum | June 26, 1928 |
| 1,734,975 | Loomis et al. | Nov. 12, 1929 |
| 1,738,565 | Claypoole | Dec. 10, 1929 |
| 1,992,938 | Chambers et al. | Mar. 5, 1935 |
| 2,055,515 | Yarbrough | Sept. 29, 1936 |
| 2,072,982 | Dale | Mar. 9, 1937 |
| 2,089,983 | Richer | Aug. 17, 1937 |
| 2,163,649 | Weaver | June 27, 1939 |
| 2,170,178 | Williams | Aug. 22, 1939 |
| 2,184,809 | Brammer | Dec. 26, 1939 |
| 2,191,119 | Schlumberger | Feb. 20, 19940 |
| 2,200,476 | Mounce | May 14, 1940 |
| 2,231,243 | Beers | Feb. 11, 1941 |
| 2,250,775 | Rice | July 29, 1941 |
| 2,257,997 | Barnes | Oct. 7, 1941 |
| 2,265,768 | Athy et al. | Dec. 9, 1941 |
| 2,281,751 | Cloud | May 5, 1942 |
| 2,437,456 | Bodine | Mar. 9, 1948 |